United States Patent [19]

Burnside

[11] Patent Number: 4,516,744
[45] Date of Patent: May 14, 1985

[54] HELICOPTER DOLLY

[76] Inventor: Donald L. Burnside, 6312 Caballero, Coral Gables, Fla. 33152

[21] Appl. No.: 444,196

[22] Filed: Nov. 23, 1982

[51] Int. Cl.$^3$ .............................................. B64F 1/04
[52] U.S. Cl. .................................. 244/17.17; 244/50; 180/14.1
[58] Field of Search .................. 244/17.17, 50; 280/8, 280/445, 675, 47.13 R, 47.15, 478, 96.1; 180/14 C; 414/458-461, 498; 254/93 R, 133; 29/252

[56] References Cited

U.S. PATENT DOCUMENTS

| | | | |
|---|---|---|---|
| 84,310 | 11/1868 | Shmetzer | 280/8 |
| 1,744,654 | 1/1930 | Lorenzer | 280/8 |
| 2,041,947 | 5/1936 | Olley | 280/675 |
| 2,248,080 | 7/1941 | Hathaway | 180/14 C |
| 2,661,856 | 12/1953 | Stanley et al. | 280/47.13 R |
| 2,715,261 | 8/1955 | Williams | 29/252 |
| 2,834,599 | 5/1958 | Sarchef | 414/498 |
| 2,949,317 | 8/1960 | Zaha | 280/445 |
| 3,010,592 | 11/1961 | Chadwick | 414/458 |
| 3,261,488 | 7/1966 | Van Rader | 414/498 |
| 3,279,722 | 10/1966 | Glover, Jr. et al. | 244/17.17 |
| 3,285,449 | 11/1966 | Hand | 414/498 |
| 3,437,354 | 4/1969 | Heffen | 280/8 |
| 4,033,422 | 7/1977 | Benning | 244/50 |
| 4,223,856 | 9/1980 | DiVincenzo | 244/50 |
| 4,269,429 | 5/1981 | Eichstadt | 180/14 C |

FOREIGN PATENT DOCUMENTS

| | | | |
|---|---|---|---|
| 863454 | 1/1953 | Fed. Rep. of Germany | 280/47.15 |
| 1198208 | 8/1965 | Fed. Rep. of Germany | 180/14 C |
| 677437 | 8/1952 | United Kingdom | 280/47.15 |
| 1382265 | 1/1975 | United Kingdom | 180/14 C |

*Primary Examiner*—Galen L. Barefoot
*Attorney, Agent, or Firm*—Malin, Haley, McHale, & Barron

[57] ABSTRACT

A ground handling system for lifting, supporting, maneuvering, and transporting aircraft fitted with skid-type landing gear comprising a dolly assembly of tandem wheel assemblies, a yoke assembly, and a detachable jack assembly. The jack assembly utilizes a modified, standard, hand-operated hydraulic jack mounted on a platform straddling the skid tube to provide over-center lifting force to existing fixed wheel attachment strong points on the skid tubes. An adjustable inverted U-shaped lift member translates the vertical thrust of the piston of the jack below the platform to the skid tube. An adaptor pivotally mounted to the lift member grasps and accommodates unevenly-mounted attachment points. Two jack assemblies are utilized to lift the aircraft generally simultaneously at opposing attachment points which are generally at the plane of the center of gravity of the aircraft. While the aircraft is raised and balanced on the jack assemblies, the two wheel assemblies are placed in tandem under the skid tubes, the rear wheel assembly to the rear of the attachment points and the front wheel assembly under the front portion of the skid tubes. The tandem wheel assemblies provide a wide wheel base for stability and maneuvering. The front wheel assembly has at least two opposing, steerable caster wheels for maneuver which may be locked to facilitate backing up, and the rear wheel assembly has at least two opposing co-axial, fixed wheels with a camber and toe-in configuration to facilitate tracking. The wheel pintles of the rear wheels are elevated above the axle by a connecting flange to provide additional clearance.

24 Claims, 20 Drawing Figures

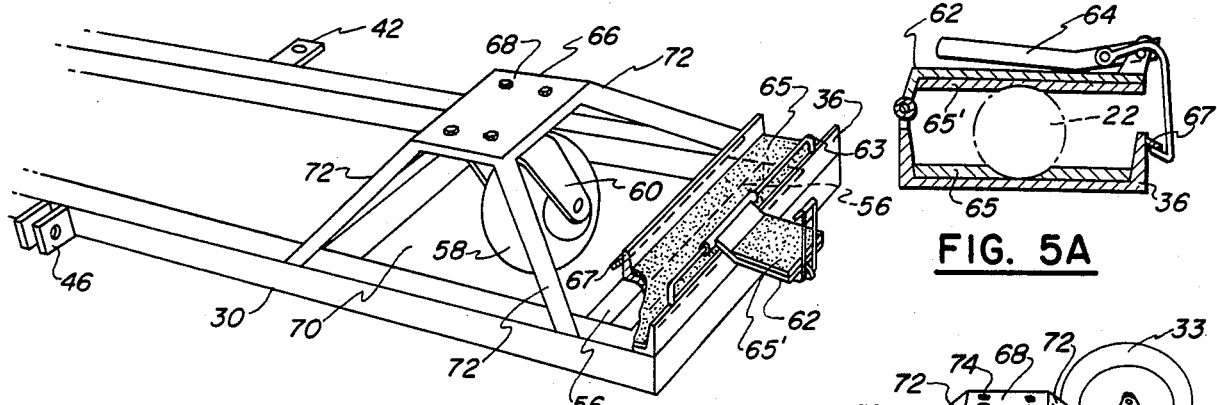
FIG. 4
FIG. 5A
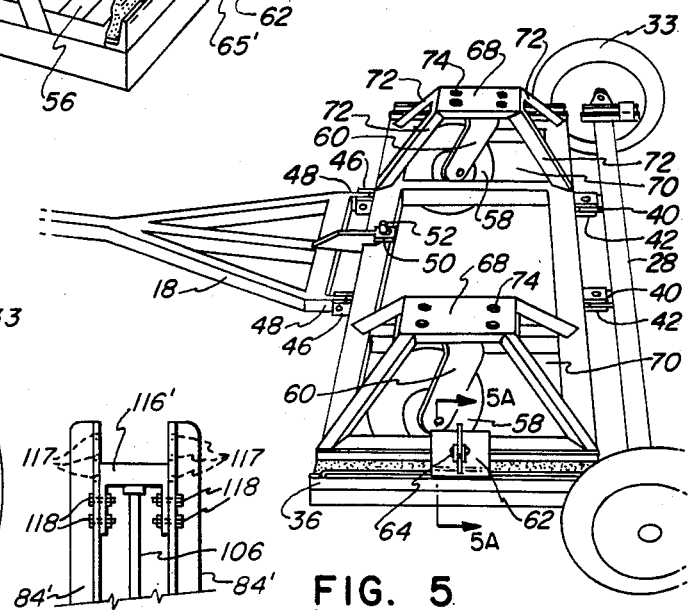
FIG. 5
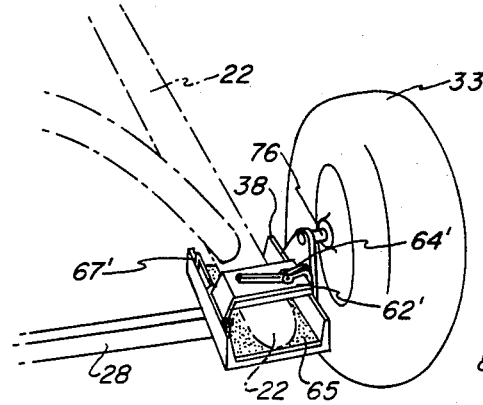
FIG. 6
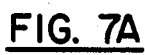
FIG. 7A
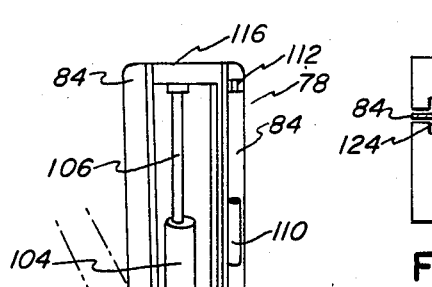
FIG. 7
FIG. 7B
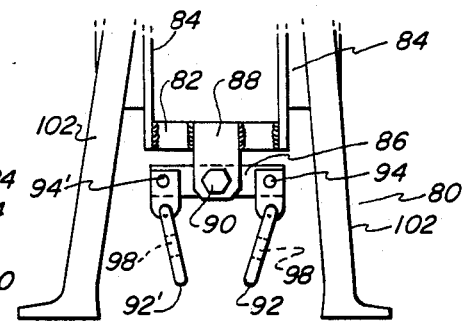
FIG. 8
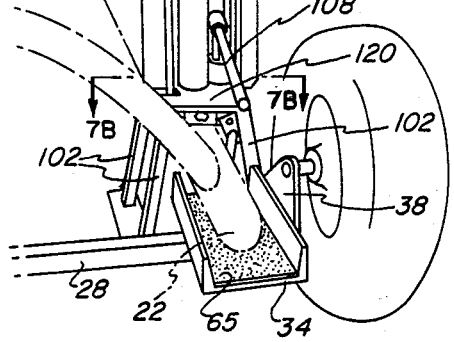
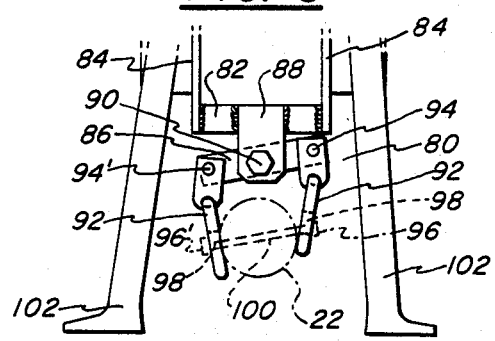
FIG. 9

HELICOPTER DOLLY

BACKGROUND OF THE INVENTION

1. Field of the Invention

This invention relates to devices for ground handling aircraft, specifically those equipped with skid-type landing gear such as helicopters.

2. Description of Prior Art

Previously the typical means of maneuvering a helicopter with skid-type landing gear was (1) to attach its factory-supplied ground handling wheels and utilize two or more personnel to balance, maneuver and push the aircraft or (2) to utilize a hydraulic lifting and towing device such as that shown in U.S. Pat. No. 4,223,856 to DiVincenzo, or No. 4,033,422 to Benning.

Such devices have numerous disadvantages in maneuvering and lifting the aircraft, such as:

(1) Utilizing solely the ground wheels requires two or more personnel to balance the aircraft on the wheels while pushing and maneuvering the aircraft;

(2) Hydraulic devices are complex and require sophisticated maintenance. Such devices have also been known to damage the aircraft by improper use or placement of the powerful hydraulic components. The integral hydraulic devices can only be utilized with a single aircraft. In addition, once the aircraft is moved to its new location, it is placed on the ground again, and if it is to be moved again the hydraulic device must be used again.

The difficulty with DiVincenzo No. 4,223,856 is that the weight of the helicopter is borne by a yoke which is attached in the center to a carriage and at ends to the aircraft. As a result, the aircraft is essentially hinged at the yoke connection to the carriage creating an unstable balance situation. In addition, the skids require special attachments.

The difficulty with Benning No. 4,033,422 is that the helicopter is also in an unstable balance situation due to the lifting apparatus. The instant invention overcomes these dificiencies by providing a wide wheel base with the helicopter weight on the skids.

A further drawback is the various couplings and connections involved in attaching the helicopter. Also, many devices are self-propelled and a power failure renders the device useless. In addition, the more complex the hydraulic or self-propelled device the greater the cost of purchase and maintenance. A need has been long felt in the aviation field for a ground handling apparatus which can easily attach to the skid-type landing gear of aircraft such as helicopters to provide a mobility capability which is generally non-existent in aircraft with skids and which can remain attached to the aircraft for subsequent moves. If each aircraft has its own dolly, an entire fleet of aircraft could be rapidly moved if conditions so required. The device must be capable of remaining attached to the aircraft for on-demand, immediate movement and therefore must be inexpensive but reliable. The apparatus must be able to be operated by a minimum of personnel and consist of simple components to reduce maintenance and increase availability. The apparatus must be sturdy and rugged to handle the weight of the aircraft. Previous ground handling assemblies were not capable of providing all of the above requirements. The instant invention satisfies the above requirements.

SUMMARY OF THE INVENTION

The ground handling system and apparatus for lifting, supporting, transporting, and maneuvering aircraft with skid-type landing gear comprises tandem wheel assemblies, a connectable yoke assembly for towing, and an attachable jack assembly. Each wheel assembly is an elongated frame with each end having a wheel means and a tray assembly for housing and retaining a portion of the skid tube of the skid landing gear. The rear assembly attaches to the skids rearward of the lifting point and center of gravity of the aircraft to support the weight of the aircraft and place it in a slightly nose-heavy configuration to provide weight to the front wheel assembly for traction and steering. The rear wheel assembly has fixed, co-axial cambered wheels with a slight toe-in to maintain the steering track of the dolly assembly when being transported and maneuvered. Tray assemblies having a channel attach to the axle of the rear wheel assembly to house the skid tubes. A laterally moveable cover with a latching means such as a common over-center latch is used in the skid tray assembly of both wheel assemblies to retain the skid tube in the tray assembly. The skid tray may be round or square to accommodate the skid. The skid tray may be wide to accommodate varying skid widths of the same model helicopter or may be adjustable laterally. The rear wheel assembly attaches the skid trays to the inside portion of the axle so that the wheels are outside the skids. The front wheel assembly places the skid trays outside the wheels on a reinforced support frame. The support frame for the front wheel assembly provides a generally elongated rectangular frame for attachment of supporting cages for caster wheels. The pivotally mounted caster wheels provide steerable control for the front wheel assembly and the dolly assembly as a whole. The caster wheel may be locked to facilitate maneuvering the dolly assembly in a rearward direction. The axle of the rear wheel assembly and frame assembly of the front wheel assembly may be adjustable in length by telescoping action to accommodate the skid width of various models of aircraft with skids or may be a single assembly providing a fixed configuration. A towing yoke with telescoping tongue handle is connectable to the front wheel assembly to provide for pulling or steering. An adjustable limiting device prevents the tongue from being raised high enough to impact the front of the aircraft and cause damage. The tongue telescopes within the yoke to recess to the rear of the nose of the aircraft so that it is not a hazard to personnel moving around the front of the aircraft. The rear wheel assembly attaches to the front wheel assembly to facilitate movement and storage of the dolly assembly when not attached to an aircraft.

A jack assembly independent of the dolly assembly attaches to the existing wheel attachment points which are strong points for lifting on the skids approximately at the plane of the center of gravity of the aircraft. A jack assembly is attached to each skid so that the aircraft may be evenly raised. The jack assembly utilizes a pivotal grasping adaptor to provide self-adjusting pivotal lifting contact with the skid tube to compensate for off-set lifting protrusions of the skid tube. The jack assembly has a lifting housing with a vertically-adjustable cross member to translate the vertical displacement of the lifting housing to the displacement of the piston of the jack assembly. A simple, hand-operated hydraulic, plunger-type jack has been modified to accommodate the piston displacement required for raising the skid tubes sufficient height to install the wheel assemblies. Generally, the foregoing hydraulic jack comes in two piston displacement sizes. One is too short and the other too long for the requirements of this invention. It was necessary to modify the longer model, such as the 19-inch, 1.5 ton Enerpac JHL-1.5 hydraulic pump, by shortening the reservoir housing, the cylinder, and the plunger. The jack is utilized to vertically displace elongated T-shaped parallel lifting struts of the lifting housing to provide over-center, symmetrical lifting force to the skid tube. Once the skid is raised sufficient height, the wheel assembly may be positioned with the skid trays below the skid. Releasing the relief valve of the jack slowly lowers the jack assembly onto the dolly assembly to support the weight of the aircraft and the wheel assemblies provide maneuverability. Once the jack assembly has completed its task, it may be re-used with other dolly assemblies. Wheel chocks are placed under the wheels of the dolly assembly to prevent inadvertent movement. Once the aircraft has been placed on the dolly assembly, an adjustable latching mechanism is utilized to secure the skid tubes to the skid trays which are provided with a layer of non-skid material. The dolly assembly is propelled by pulling on the yoke. The yoke may be turned to maneuver the front wheel assembly on its rotatable caster wheels. Once placed on the dolly assembly, the aircraft may continue to be supported by the dolly assembly and transported and maneuvered as required. The dolly assembly acts as a semi-permanent platform for the aircraft and it is not necessary to remove it from the dolly assembly until use of the aircraft is required.

It is an object of this invention to provide an aircraft ground handling system and apparatus for lifting, supporting, transporting, and maneuvering aircraft with skid-type landing gear.

It is a further object of this invention to provide a simple, low-cost ground handling system for lifting, supporting, transporting, and maneuvering aircraft with skid-type landing gear.

It is a further object of this invention to provide aircraft ground handling apparatus for easy installation and removal that can be readily attached to the skid landing gear of an aircraft.

A further object is to provide a dolly assembly whereby a single individual can lift, support, transport, and maneuver an aircraft with skid landing gear.

Yet a further object of this invention is to provide a dolly assembly with steerable wheels and a yoke for use in propelling the assembly.

Still another object of this invention is to provide dolly assembly which provides clearance between the assembly and aircraft components protruding from the bottom of the aircraft.

Yet another object of this invention is to provide a ground handling system which requires minimum space for storage when not in use.

Yet still another object of this invention is to provide a ground handling system with a hydraulic lifting means which may be separated from the transporting dolly assembly and used with other dolly assemblies.

This and other objects, features, and advantages of this invention will become more apparent from the detailed description that follows, when considered in connection with the accompanying drawings.

BRIEF DESCRIPTION OF THE DRAWINGS

FIG. 4 is a perspective view of a caster wheel assembly of the front wheel assembly of the dolly assembly of the instant invention in a fixed length configuration.

FIG. 5 is a perspective view of the front wheel assembly, rear wheel assembly, yoke assembly of the dolly assembly of the instant invention in a fixed length configuration and attached for transport.

FIG. 5A is a cross sectional view of the skid latching mechanism along axis 5A—5A.

FIG. 6 is a perspective view of a portion of the rear wheel assembly of the dolly assembly of the instant invention.

FIG. 7 is a perspective view of a jack assembly and a portion of the rear wheel assembly of the dolly assembly of the instant invention.

FIG. 7A is a front elevational view of the embodiment of the adjustable cross member of the lift housing of the jack assembly of the instant invention.

FIG. 7B is an overhead view along the axis 7B—7B.

FIG. 8 is a front elevational view of the bottom portion of the jack assembly of the instant invention.

FIG. 9 is a front elevational view of the jack.

PREFERRED EMBODIMENT

Figure 1:
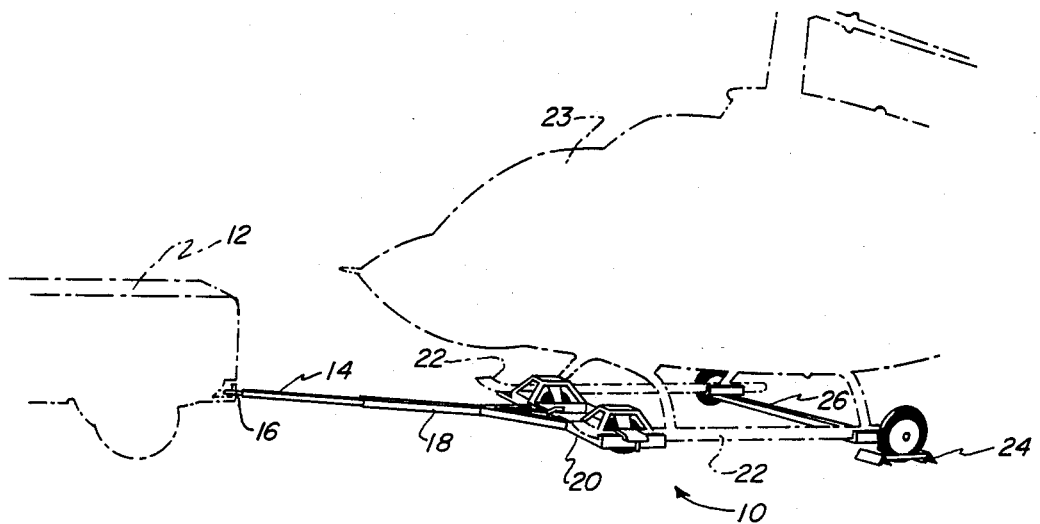
FIG. 1 is a perspective view of the dolly assembly of the instant invention.
Figure 3:
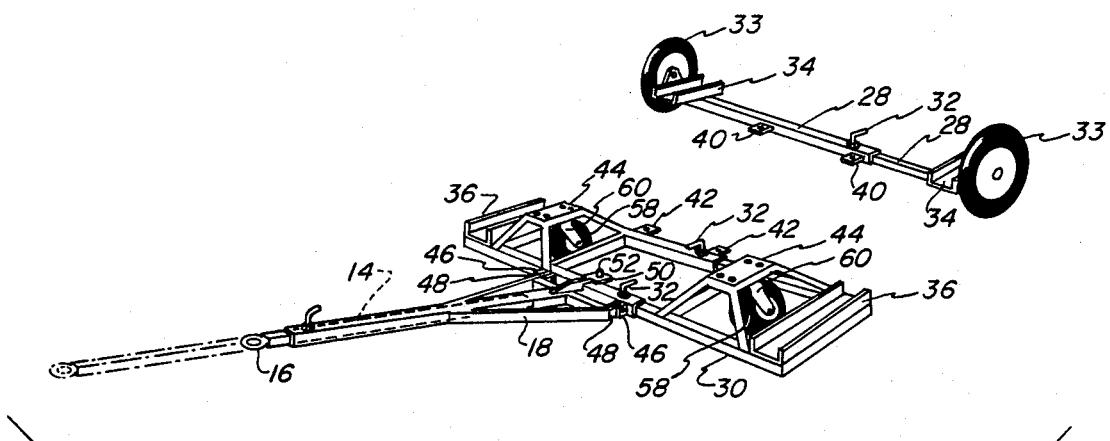
FIG. 3 is a perspective view of the dolly assembly of the instant invention in an embodiment with the adjustable components connected.

Referring now to the drawings and specifically FIG. 1, the dolly assembly is shown generally as numeral 10. Tug 12 holds the tongue 14 by hitch retainer 16 to pull the aircraft 23 mounted on assembly 10. Tongue 14 inserts into yoke 18 in telescoping action (as shown in FIG. 3) to adjust the length of tongue 14 protruding from yoke 18. Tongue 14 may telescope sufficient distance into yoke 18 so that the tongue 14 will not extend beyond the nose of the aircraft 23 while the yoke is connected to wheel assembly 20 thereby preventing a hazard to personnel operating in front of aircraft 23. Yoke 18 is connected to front wheel assembly 20 which is retaining the toe (front) portion of skid tube 22 of aircraft 23, such as a helicopter. Rear wheel assembly 26 retains the heel (rear) portion of skid tube 22 to the rear of the plane of the aircraft center of gravity. One or more ground chock 24 may be utilized to prevent inadvertent movement of the aircraft 23. When not in use, chock 24 may be attached to either wheel assembly by use of attachment flanges (not shown) for storage such as during movement. Both wheel assemblies 20 and 26 provide considerable clearance from components on the underside of aircraft 23.

Figure 2:
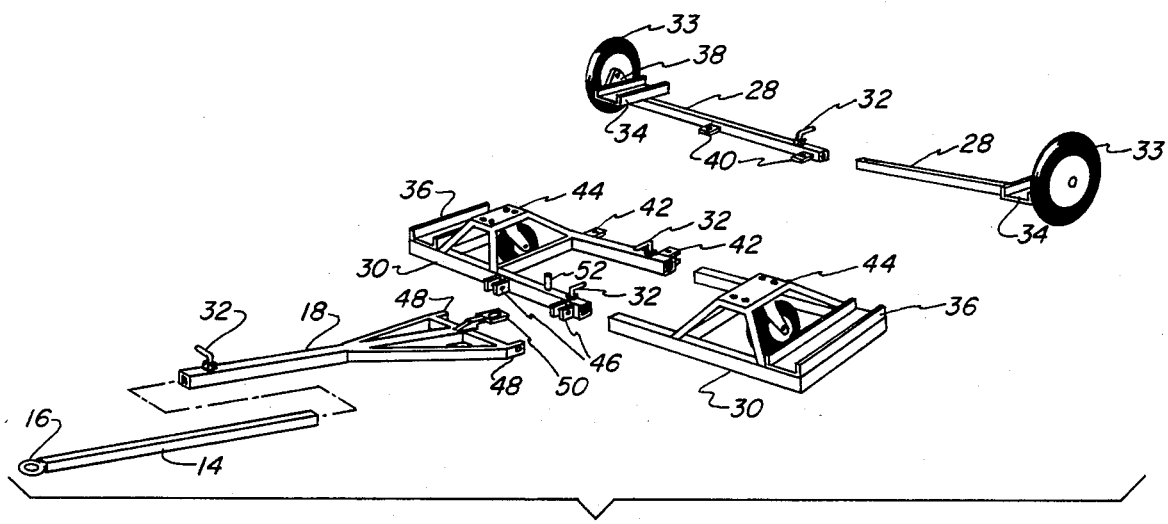
FIG. 2 is a perspective view of the dolly assembly of the instant invention in an alternate embodiment having adjustable components.

In FIG. 2 is shown a separated view of the components of an embodiment of the invention which would provide for adjustment of the length of axle 28 and front support frame assembly 30 by telescoping action (as shown in FIG. 3). A common fastener assembly such as the screw-in handle 32 may be used to maintain the axle 28 and frame assembly 30 at a fixed length. If the dolly assembly 10 is constructed for dedicated use with a specific model of aircraft, the axle 28 and frame assembly 30 can be constructed of a section of predetermined length. Rear wheel assembly 26 has an off-set wheel assembly for wheels 33 with a camber between the axle 28 and wheel pintle 76 (of FIG. 11) created by wheel off-set flange 38 to compensate for the torque effect between the axle 28 and wheel pintle 76 in a loaded configuration. The rating of the tires 33 and 58 to be utilized in the rear and front wheel assemblies will be dependant on the weight of the aircraft 23 and the surface on which aircraft will be transported. A typical rear tire 33 would be a 5.70×8 Hi Speed Trailer, Load Range D, 4-ply tread and sidewalls with load ratings of 1,075 pounds at 100 p.s.i. at 55 mph and 1,475 pounds at 100 p.s.i. at 10 mph. Since stability of the aircraft during movement is a prime consideration, the lower speed of approximately 10 mph permits to aforesaid 5.70×8 tire to sustain small utility helicopters. A typical front tire 58 would be the 2.80×4 NHS, 4-ply, polyureathane foam filled at 35 p.s.i. with a rating of 350 pounds at 10 mph. The hub bearings of both wheels would utilize Timken tapered roller bearings to sustain the load. The load of the aircraft 23 is received by the generally tandem and coaxial rear skid trays 34 and front skid trays 36. The rear skid trays 34 are generally evenly mounted by conventional means such as welding to axle 28 adjacent to wheel off-set flange 38. Rear skid trays 34 support the heels of the skid tube 22 of aircraft 23 inside the wheels 33 (see FIG. 1). The rear skid trays 34 have a channel of sufficient width to accommodate the varying width of skids on aircraft 23 which may be caused by spreading due to wear or hard landings. Axle 28 has connectors 40 for connection with connectors 42 of the front wheel assembly 20 (see FIG. 5). This connection between axle 28 and wheel assembly 20 permits the two wheel assemblies 20 and 26 to be towed together and facilitates storage together. Support frame assembly 30 is generally an elongated, rectangular frame for housing the front skid trays 36 and caster wheel assembly 44. Support frame assembly 30 has two connectors 46 in front to provide vertical pivotal connection with the connectors 48 of yoke 18. The vertically-oriented female connector 46 accommodates the vertically-oriented male connector 48 which is then fastened by an inserting pin (not shown) to provide pivotal movement in a vertical plane. In this manner, yoke 18 may be raised and lowered to accommodate various towing means including an individual (not shown) pulling the dolly assembly 10 by the tongue 14 of yoke 18. A vertical limiting device is provided consisting of generally horizontal flange 50 connected to yoke 18 and generally vertical bolt 52 connected to the top of frame assembly 30. Bolt 52 accommodates flange 50 by insertion through a generally horizontal aperture 54. A nut (not shown) may be attached to bolt 52 above flange 50 to provide impinging contact with flange 50 to limit the upward displacement of flange 50 and thereby the downward displacement of yoke 18 as it is vertically rotated about the pivotal connection of connectors 46 and 48. Upward displacement of yoke 18 is limited by impinging contact of flange 50 with frame assembly 30 and bolt 52 upon rotation about connectors 46 and 48 to prevent the yoke 18 from impacting with the front of aircraft 23 and causing damage. As shown in FIG. 2, tongue 14 inserts into yoke 18 in telescoping cooperation to provide an adjustable length to tongue 14. Tongue 14 has a common hitch retainer 16 for attachment to a towing means.

Referring now to FIG. 3 is shown an embodiment of dolly assembly 10 with the wheel assembly 26 and 20 having axle 28 and support frame assembly 30 in telescopic connection. The yoke 18 is shown connected to the support frame assembly 30 at connectors 48 and 46. Tongue 14 is shown telescoped within yoke 18. The flange 50 is shown inserted over bolt 52 of the yoke limiting device. The wheel 33 of the rear wheel assembly 26 is generally larger than wheel 58 of the caster wheel unit 60 due to the heavier load which is sustained by the rear wheel assembly 26. Generally, wheel 33 will be a 17-inch wheel or larger capable of supporting the static gross operating weight of the aircraft 23. Since the rear skid tray 34 is positioned just rearward of the plane of the aircraft center of gravity thereby supporting more weight than the front wheel assembly 20, the wheel 33 must be larger than wheel 58 and is placed outside the skid tube 22 to provide adequate clearance from the aircraft 23. If the wheels 33 were positioned inside the skid tray 34, the clearance from the aircraft would require the wheel to be smaller and generally would not be capable of supporting the weight of heavier aircraft. The rear wheels 33 are also placed outside the skid tube 22 to provide a wide base for the rear wheel assembly 26 to enhance stability of the aircraft while being transported on dolly assembly 10 to prevent the aircraft from tipping over. The problem with stability arises in those prior systems which place the wheels of the system inside the skids of the aircraft. Due to the vertical height of the center of gravity of the aircraft 23, the probability of tipping over during movement is increased by placing the transporting wheels inside the skids. In addition, the wheel pintle 76 of the rear wheel 33 is angled slightly forward to cause the wheel 33 to toe inward. This feature improves the tracking of the rear wheel assembly 26 behind the front wheel assembly 20 during movement. In an alternative embodiment of the instant invention, the rear wheel assembly 26 could be replaced by the ground handling wheels (see FIG. 13) which are normally original equipment with the aircraft. The aircraft 23 should then be configured to provide adequate weight to the toe of the skids to give the front wheel assembly 20 traction for steering since the ground handling wheels normally attach at the aircraft center of gravity.

Referring now to FIGS. 4 and 5A, there is shown the skid latching mechanism comprising a skid tube latch cover 62 which is placed over the skid tube 22 and a common over-center latching mechanism 64 which attaches to the skid tray to provide downward retaining pressure on the cover 62 and skid tube 22 to hold the skid tube 22 in place and prevent it from sliding off of the skid tray during movement, especially inadvertent jerking movement of the dolly assembly by the towing means. Contact means such as layer 65 and 65' provide generally non-skid contact for the skid tube 22 in the skid trays. Neoprene inserts may be used: 60 durometer for layer 65; and 40 durometer for layer 65'. Latch cover 62 is shown hinged to tray 36 by pivotal connection with rail 63. Protrusion 67 provides retaining contact with the latching mechanism 64. Skid tray 36 is shown partially cut away to reveal the supporting brace 56 which is attached to support frame 30 to provide additional support for skid tray 36 which is cantilevered outside caster wheel assembly 44 and supports the weight of aircraft 23. On the front wheel assembly, the latch cover 62 is pivotally mounted to the outside of skid tray 36 so that cover 62 will rotate outward away from wheel 58 to prevent entanglement with the caster wheel unit 60. Cover 62 may be slideably mounted on rail 63 to provide horizontal adjustment of the latch cover 62 to accommodate various skids.

FIGS. 4 and 5 show the support frame assembly 30 with its support cage 66 for the caster wheel unit 60. Assembly 30 provides two opposed generally rectangular apertures over which is suspended the support cage assembly 66 which supports the caster wheel unit 60 by attachment to an elevated support plate 68. Caster wheel unit 60 provides caster wheel which is pivotally connected to elevated support plate 68. Plate 68 is supported generally in the center of frame aperture 70 by a plurality of support legs 72 which are attached by means such as welding between plate 68 and assembly 30 to allow assembly 30 to be suspended above the ground by the caster wheel assembly 60. By squatting below the support plate 68, frame assembly 30 allows clearance from the underside of aircraft 23 (see FIG. 1). A plurality of common fastening means such as bolts 74 are used to connect caster wheel unit 60 to support plate 68. In FIG. 5, the limiting device of flange 50 and bolt 52 is shown.

FIG. 6 shows the rear skid tray 34 mounted on axle 28. Tray 34 provides an elongated channel of sufficient width to accommodate the heel of skid tube 22 as shown in FIG. 6. Tray 34 is mounted generally equally on axle 28 immediately adjacent to the wheel off-set flange 38. Wheel off-set flange 38 is connected to wheel pintle 76 and axle 28 providing a downward off-set distance between axle 28 and wheel pintle 76 to provide clearance between axle 28 and the underside of aircraft 23 (see FIG. 1). Wheel pintle 76 is housed in the hub of wheel 33. Latch mechanism 64' and cover 62' are shown retaining skid tube 22 on layer 65. Cover 62' is mounted on the inside of skid tray 34 to prevent entanglement with wheel 33. Cover 62' is pivotally mounted on rail 67 for horizontal adjustment of cover 62' along tray 34 to accommodate various tube 22.

FIG. 7 shows the hydraulic jack assembly 78 attached to skid tube 22. Referring now to FIG. 8 is shown the grasping adaptor 80 for attaching the skid tube 22 to the jack assembly 78. Adaptor 80 comprises an attachment bar 82 for connection by means such as welding between the dual, generally parallel, T-shaped lifting struts 84. Attached by means such as welding to opposite sides of bar 82 and generally perpendicular to bar 82 are connector bars 88 and 88' (not shown) providing a female receptacle to accommodate cross member adaptor bar 86. Cross member adaptor bar 86 is pivotally connected between bar 88 and 88' (not shown) with a fastening means such as a bolt at pivotal point 90. Grasping flange 92 and 92' are pivotally attached by a fastening means such as a bolt at pivotal points 94 and 94', respectively. The upper portion of the grasping flange 92 and 92' has two parallel portions forming a female receptacle for accepting the end portion of cross member 86. There is an aperture through both member 86 and both portions of flange 92 and 92' to accommodate a fastening means such as a bolt at pivot point 94. The grasping flange 92 and 92' consists of two portions which are fastened together at a mid-point by means such as welding and which form an angle less than 180° to provide a toe-in effect to the bottom portion of the flange for retaining certain protrusions 96 and 96' on the skid tube 22 in aperture 98 and 98' (see FIG. 9). The effect of the toe-in configuration of the grasping flange is that the upward force of the struts 84 will cause the flange 92 and 92' to rotate inward about point 94 and 94' to securely grasp skid tube 22 and protrusions 96 and 96' to prevent slipping off. Protrusions 96 and 96' are usually end portions of a bolt 100 which runs through skid tube 22, as shown in FIG. 9, and acts as contact points for mounting ground holding wheels. This bolt is usually not perfectly horizontal and therefore the grasping adaptor 80 is necessary to provide pivotal adjustment in the jack assembly 78 as previously described so that the uneven lifting force which would be applied to the off-set protrusions of the tube 22 by a rigid attachment does not twist or over-torque the skid tube causing damage. The jack assembly 78 is supported by a plurality of legs 102 and in the preferred embodiment four legs 102 are used to straddle the skid tube 22 while lifting it. Straddling the skid tube 22 allows the hydraulic lifting force to be generally centered in the jack assembly 78 and directly over the skid tube 22. In addition, since the skid tube extends outward from aircraft 23, the jack assembly does not impinge against the aircraft 23 or its components.

Referring now to FIG. 7, the jack assembly 78 is shown installed on the skid tube 22 and rear wheel assembly 26 is shown emplaced under the skid tube 22. The jack assembly 78 utilizes a common hydraulic jack 103 having a reservoir housing 104, plunger 106, and a cylinder (not shown). Handle 108 is utilized to operate the hydraulic jack. When not in use, handle 108 is stored by inserting it vertically in a cylindrical retainer 110 and is held by impinging slip 112. An inserted "U" apparatus, the lift housing 114, converts the vertical displacement of plunger 106 into vertical displacement of grasping adaptor 80 by connection with the T-shaped struts 84. Cross member 116 distributes the lifting force of piston 106 evenly to struts 84. FIG. 6A shows an alternative embodiment of cross member 116. Cross member 116 is an inserted "U" device which may be placed between struts 84' at various positions indicated by aperture 117 and fastened by means such as bolts 118 through the member 116' and aperture 117. By raising or lowering member 116', the vertical displacement of piston 106 will dictate the limits of lift of the jack assembly. FIG. 6B shows the placement of the hydraulic jack 103 on platform 120 which is supported by legs 102. Hydraulic jack 103 is secured to platform 120 by a fastening means such as bolts 122. The T-shaped struts 84' are retained in a T-shaped channel 124 in platform 120 to provide stability to the jack assembly under loading conditions. Further stability is provided by the fact that skid tube 22 is generally centered under the lifting components of the jack assembly 78 (as shown in FIGS. 6, 6B, 8, and 9), and further that the grasping adaptor 80 generally prevents torquing force from being transmitted to the jack assembly 78 thereby preventing an unbalanced condition in the jack assembly 78 as it raises the skid tube. Member 116' may be detached from strut 84' so that strut 84' may be removed from the jack assembly 78 by withdrawing them downward through channel 124. Then a new set of strut 84" (not shown) with a different adaptor 80' (not shown) may be installed on the jack assembly. Member 116' is then fastened between strut 84" to translate the lift to adaptor 80'. Various skids may require different adaptors for grasping.

Figure 10:
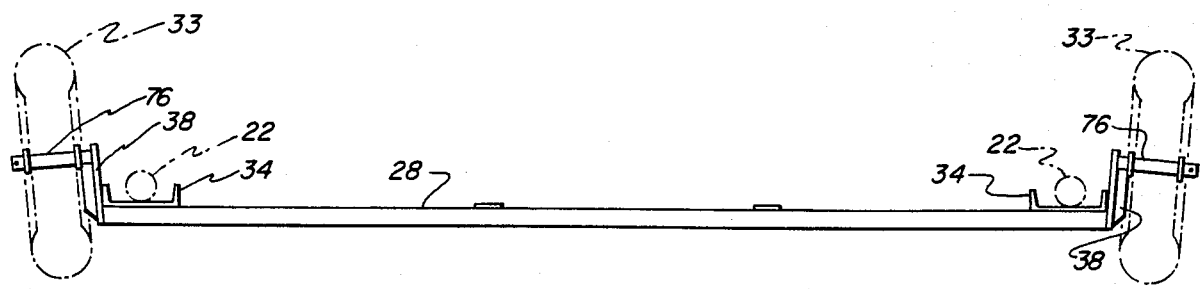
FIG. 10 is a front elevation view of the rear wheel.

FIG. 10 provides a front elevational view of rear axle 28 in an embodiment having a fixed length to accommodate a specific distance between skids 22. Wheel pintle 76 provides mounting for hub (not shown) of wheel 33 (shown in phantom). Wheel off-set flange 38 connects the pintle 76 to the axles 26 to lower the axle 28 and provide additional clearance from the aircraft 23 (see FIG. 1). Skid tray 34 provides a channel to retain skid 22.

Figure 11:
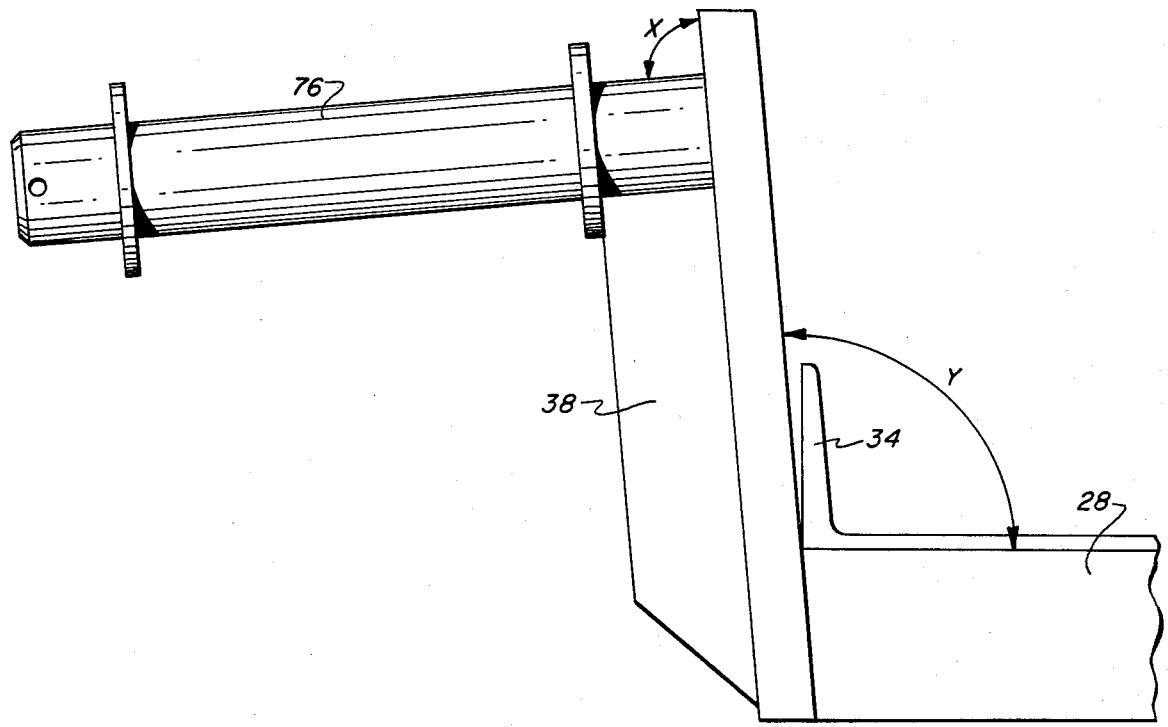
FIG. 11 is a front elevational view of the off-set flange.

FIG. 11 shows a front elevational view of the angular interrelation between axle 26, off-set flange 38, and wheel pintle 76. Angle Y is measured between axle 28 and off-set flange 38. The measure of angle Y is greater than 90° to provide a camber to the wheel 33. An optimum measure of angle Y would be approximately $94^{3}/4^{0}$. Angle X, the angle between the pintle and the off-set flange 38, should be 90°. Skid tray 34 is connected to axle 28 as shown.

Figure 12:
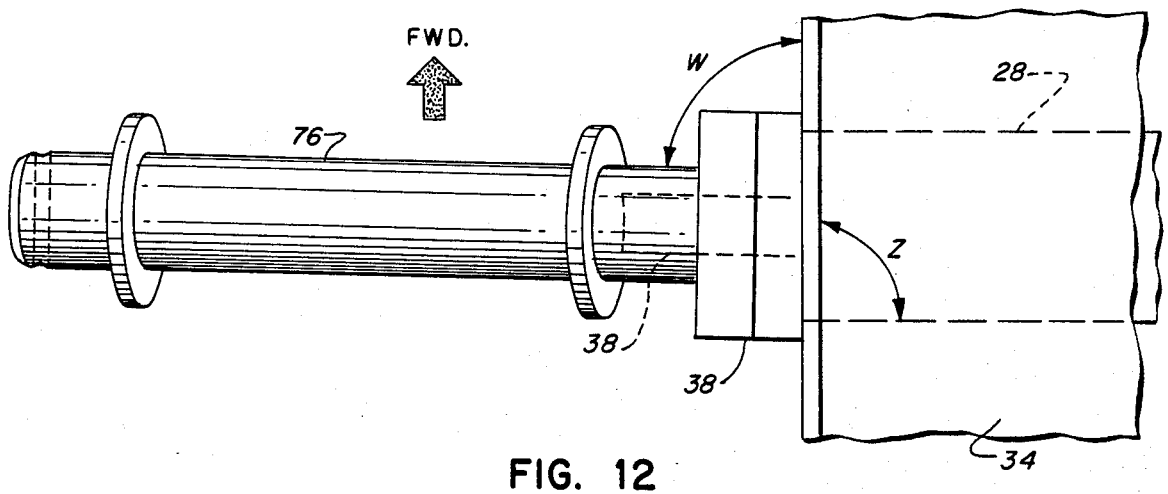
FIG. 12 is an overhead view of the wheel pintle.

FIG. 12 shows an overhead plane view of the horizontal angular relationship of pintle 76, flange 38, and axle 28. Angle Z is measured horizontally between the axle 28 and flange 38 and measure less than 90°, generally 89°. Angle W is measured horizontally between the flange 38 and pintle 76 and equals 90°. The foregoing angular relationships provide for a slight toe-in configuration for wheel 33 of at least 1°. This toe-in will insure that the rear wheel assembly 26 tracks behind the front wheel assembly 20 during movement under a loaded condition.

Figure 13:
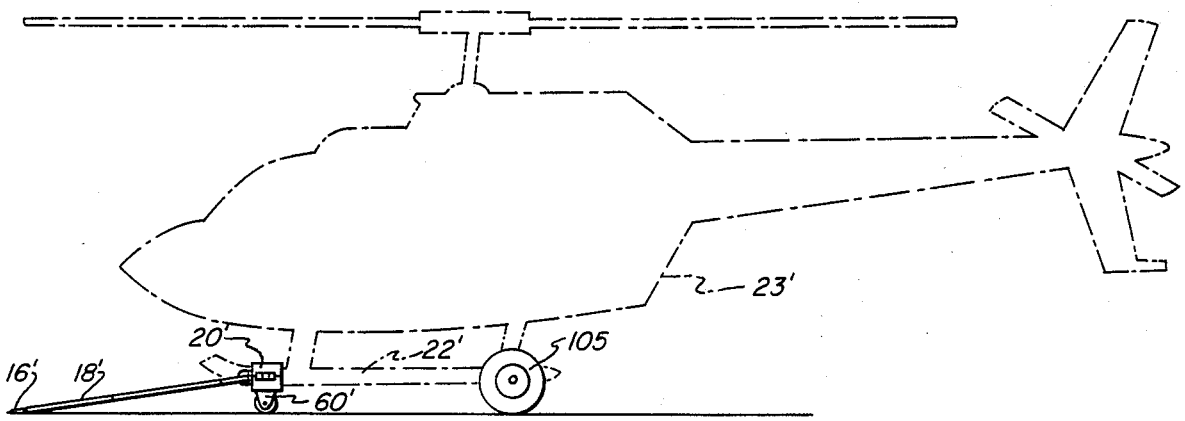
FIGS. 13, 14, 15, 16, and 17 are elevational views of an alternative embodiment.

FIG. 13 shows an alternative embodiment of the instant invention. Aircraft 23' is mounted on ground handling wheels 105, front wheel assembly 20', and caster wheel unit 60'. Yoke 18' provides connection with a propulsion means (not shown) by hitch retainer 16'.

Figure 14:
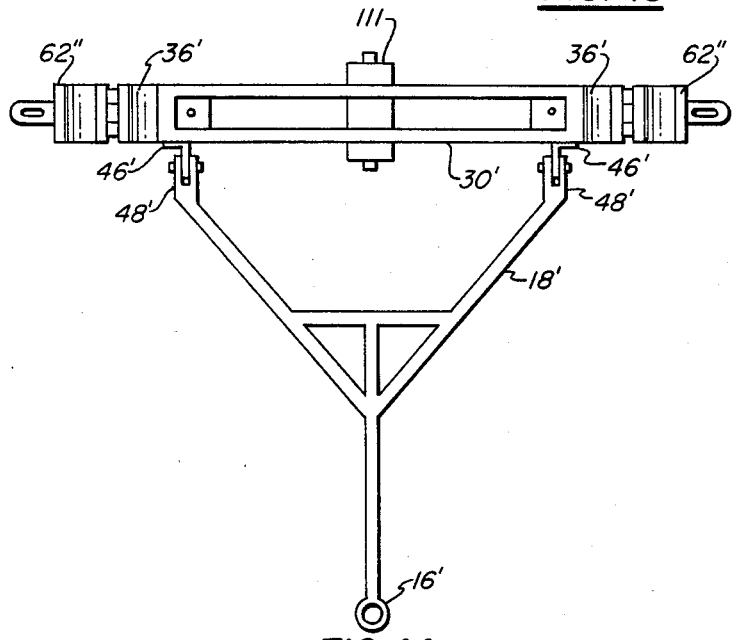

FIG. 14 shows another view of the alternative embodiment of the instant invention. Support frame assembly 30' provides skid tray 36' and cover 62" for retaining the skid outside wheels 58' thereby providing a wide base for stability. Latch mechanism 64" comprises hasp 107 and wing-nut 109 for retaining the skid 22'. Connectors 46' and 48' are shown providing pivotal connection between yoke 18' and wheel assembly 20'.

Figure 15:
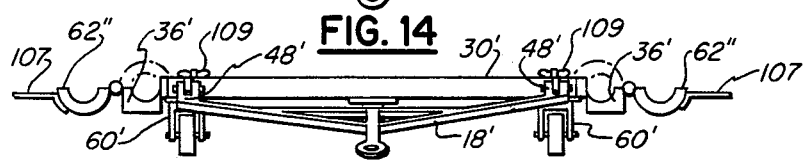
Figure 16:
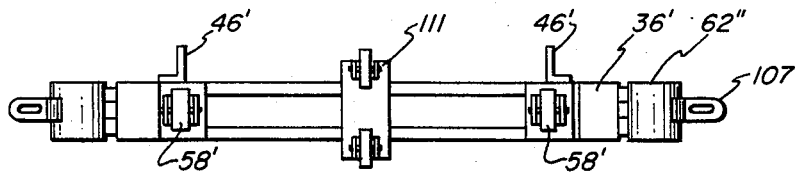
Figure 17:
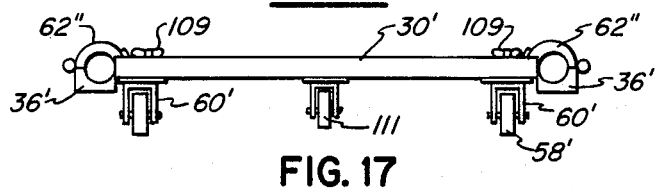

FIGS. 15, 16, and 17 show different views of the alternate embodiment as previously discussed. The new embodiment utilizes an additional set of wheels 111 for added stability and support during movement.

We claim:

1. A ground handling system for a helicopter equipped with two opposed, landing skids, comprising:
a front support means for retaining the front portion of the two skids of the helicopter and for supporting the weight of the helicopter on the front portion of the two skids, said front support means connectable to a propulsion means for towing said front support means; and
a means connected to said front support means for maneuvering said front support means,
said means includes a front wheel assembly means connected to said front support means for turning and maneuvering said front support mans, and for supporting said front support means out of ground contact to provide clearance between the helicopter and said front support means,
said front support means includes an elongated framework assembly connected to said wheel assembly means, said framework assembly having a first skid retaining means connected thereto for cradling the front portion of the skids and accomodating varying width between skid tubes, and said front wheel assembly means connected to said framework assembly includes a suspended wheel means in contact with the ground, said first skid retainer means includes a tray means for supporting the underside of the skids and a skid latch cover means for containing the skids, a rear wheel assembly means connected to the rear portion of the skids for supporting the weight of the helicopter on the rear portion of the skids and for transporting the helicopter, said wheel means includes at least one wheel connected to said front wheel assembly adjacent to each end of said framework assembly, said whel having a locking means for securing said wheel in a fixed position for control during rearward movement of said front support means, said rear wheel assembly means includes at least two wheels and an axle assembly, said axle assembly includes a skid retaining means connected to said axle for cradling the rear portion of the skids and accomodating varying width between skid tubes, said skid retaining means includes a tray means for supporting the underside of the skids and a skid latch cover means for containing the skids.

2. A system as set forth in claim 1, wherein: said wheels of said rear wheel assembly means are fixed and are connected to said axle by an offset flange means for lowering the axle to provide clearance from the aircraft and for providing camber to said fixed wheels.

3. A system as set forth in claim 2, wherein:
said fixed wheel having a toe-in configuration; and said rear wheel assembly and said framework assembly having means for connecting together said rear wheel assembly and said framework assembly for towing and storage.

4. A system as set forth in claim 3, wherein:
said skid retaining means includes an elongated tray apparatus having a channel housing and retaining the skid, said channel of sufficient width to accommodate varying widths of the skids.

5. A system as set forth in claim 4, wherein:
said axle is adjustable in width and said framework assembly is adjustable in width accommodating the various widths of different models of helicopters.

6. A system as set forth in claim 5, wherein:
said skid retaining means connected to said axle inside said fixed wheels.

7. A system as set forth in claim 6, wherein:
said front support means includes a yoke means connectable to said framework assembly for turning and maneuvering said framework assembly, and said yoke means connectable to a propulsion means.

8. A system as set forth in claim 7, wherein:
said yoke means includes a tongue means connected to said yoke means for extending from and receding into said yoke means for attachment to the propulsion means.

9. A system as set forth in claim 8, further including:
a limiting means connected to said yoke means for limiting the height the yoke means may be raised to prevent impact damage to the nose of the aircraft by the yoke means.

10. A ground handling system for lifting, supporting, maneuvering and transporting a helicopter equipped with two opposed skids comprising:

a helicopter dolly means for supporting, maneuvering and transporting a helicopter equipped with two opposed skids;

a lifting means connectable to the aircraft for lifting the aircraft to sufficient height to permit said dolly means to be positioned under the skids of the aircraft, and lifting means having a release means for lowering the helicopter onto said dolly means, said lifting means disconnectable from the helicopter after helicopter is positioned on said dolly means, said lifting means includes a jack means connectable to the skids for lifting the helicopter by raising the skids, said jack means includes a pair of jack assembly means, each jack assembly means connectable to an opposing skid of the helicopter in proximity to the center of gravity of the helicopter for providing generally simultaneous lifting force substantially through the center of gravity of the helicopter to enable the helicopter to be lifted with substantially the entire load of the aircraft borne by the jack assembly means while a rear wheel assembly is emplaced under the heel of the skid generally adjacent to the center of gravity of the aircraft and while a front wheel assembly is emplaced under the toe of the skid generally well forward of the center of gravity of the aircraft, said jack assembly means having a means for releasing the lifting force when said front and rear wheel assemblies are in place under the skids and said jack assembly means disconnectable from the skids after lowering said helicopter, said jack assembly means includes a hydraulic jack means, platform means, lift housing means and skid grasping means, said hydraulic jack means connected to said platform means for providing hydraulic vertical lifting force, said platform means straddles the skid in a straddling position to provide in combination with the hydraulic jack means centered, overhead lifting force to the skid.

11. A ground handling system for lifting, supporting, maneuvering said transporting a helicopter equipped with two opposed skids comprising:

a helicopter dolly means for supporting, maneuvering and transporting a helicopter equipped with two opposed skids, and a lifting means connectable to the aircraft for lifting the aircraft to sufficient height to permit said dolly means to be positioned under the skids of the aircraft, said lifting means having a release means for lowering the helicopter onto said dolly means, said lifting means disconnectable from the helicopter after helicopter is positioned on said dolly means, said lifting means includes a jack means connectable to the skids for lifting the helicopter by raising the skids, said jack means includes a pair of jack assembly means, each jack assembly means connectable to an opposing skid of the helicopter in proximity to the center of gravity of the helicopter for providing generally simultaneous lifting force substantially through the center of gravity of the helicopter to enable the helicopter to be lifted with substantially the entire load of the aircraft borne by the jack assembly means while a rear wheel assembly is emplaced under the heel of the skid generally adjacent to the center of gravity of the aircraft and while a front wheel assembly is emplaced under the toe of the skid generally well forward of the center of gravity of the aircraft, said jack assembly means having a means for releasing the lifting force when said front and rear wheel assemblies are in place under the skids and said jack assembly means disconnectable from the skids after lowering said helicopter, said jack assembly means includes a hydraulic jack means, platform means, lift housing means and skid grasping means, said hydraulic jack means connected to said platform means for providing hydraulic vertical lifting force, said platform means straddles the skid in a straddling position to provide in combination with the hydraulic jack means centered, overhead lifting force to the skid, said lift housing means connected to said hydraulic jack means and connectable to the skid for translating said overhead vertical lifting force to the skid centered below said platform means, said grasping means connected to said lifting housing means and operatively engaging the skid for retaining the skid to said lift housing during vertical movement of the skid, and said hydraulic jack means having a release means for releasing hydraulic pressure to lower the skid.

12. A system as set forth in claim 11, wherein:
said hydraulic jack means includes a common hand operated hydraulic jack, said hydraulic jack having a hydraulic pressure operated, vertical displacement plunger, said hydraulic jack having a pressure release valve.

13. A system as set forth in claim 12, wherein:
said lift housing means includes an inverted U-shaped member connected to said hydraulic jack means operatively engaging the skid, said member raised and lowered by said plunger, said member having a removeable cross-member and two elongated generally parallel vertical strut members, said cross member connected to said strut members at the top of said member by removeable fastening means, and said grasping means connected to a lower portion of said strut members.

14. A system as set forth in claim 13, wherein:
said skid grasping means includes a pivotal yoke assembly means for attaching to protruding strong points on the skid and for rotating to compensate for uneven torqueing force caused by misalignment of the skid strong points, said pivotal yoke assembly having opposed inward-inclined grasping flanges with apertures for accommodating the protruding strong points on the skid.

15. A system as set forth in claim 14, wherein:
said framework assembly includes two front skid retaining means and two wheel means, said elongated framework assembly having one wheel means connected to each end of said framework assembly providing maneuverability to said framework assembly; and one of each said front skid retaining means connected to said framework assembly outside each said wheel means for retaining and accommodating skids having differing widths.

16. A system as set forth in claim 15, wherein:
said wheel means includes at least one caster wheel pivotally connected to said framework assembly.

17. A system as set forth in claim 16, wherein:
said front skid retaining means includes a skid latching means for securing the skid to said front skid retaining means.

18. A system as set forth in claim 17, further including:
a rear wheel assembly;
said rear wheel assembly including two rear skid retaining means, an axle and at least two wheels, one wheel connected to each end of said axle, one rear skid retaining means connected to said axle adjacent to and inside said wheel for retaining and accommodating skids having differing widths.

19. A system as set forth in claim 18, wherein:
said rear wheel assembly includes an off-set flange connecting said wheel to said axle wherein said axle is below a hub of said wheel, said wheels having camber from the connection of said flange, said axle having a wheel pintle with a toe-in configuration for said wheels.

20. A system as set forth in claim 19, where:
said rear skid retaining means includes a skid latching means for securing the skid to said rear skid retaining means.

21. A system as set forth in claim 20, wherein:
said rear wheel assembly and said framework assembly having a means adjusting for the length of said rear wheel assembly and said framework assembly to accommodate differing widths between skids of a helicopter.

22. A system as set forth in claim 21, including a connector means for attaching framework assembly to said rear wheel assembly for towing and storing.

23. A system as set forth in claim 22, wherein:
said framework assembly includes an adjustable yoke means for adjustably connecting said framework assembly to a propulsion means, said yoke means including a limiting means for restricting the upward movement of said yoke means to prevent impact with the helicopter.

24. A ground handling system for helicopters with skid-type landing gears, comprising:
a rear wheel assembly and two jacking assemblies; a front wheel assembly including an elongated frame, two caster wheels, and two skid trays, one caster wheel connected adjacent to each end of said frame, one skid tray connected to each said end beyond said caster wheel, said skid tray having a channel of sufficient width to accommodate the differing width between the skids of a helicopter; a yoke assembly including a tongue and limiting device, said yoke assembly connected to said frame in a vertically pivotal association, said tongue connects to said yoke in telescoping cooperation, said tongue connectable to a propulsion means, said limiting device connected to said yoke, vertical movement of said yoke interrupted by impinging contact by limiting device on said frame,
said rear wheel assembly includes an elongated axle, two wheels, an off-set flange and two skid trays, one wheel connected to each end of said axle by an off-set flange, said axle being lower than a hub of said wheel, said two wheels having camber, one skid tray connected adjacent to each end of said axle inside said wheel, said skid tray having a channel of sufficient width to accommodate the differing width between skids of a helicopter, said rear wheel assembly connectable to said front wheel assembly by connecting means for towing and storing; and said jacking assembly connectable to each opposing skid, said jacking assembly including a hydraulic jack having a vertical displacement plunger, a platform having a horizontal floor vertically supported by four legs at a height sufficient to raise the rear portion of a skid above the level of said skid tray of said rear wheel assembly, an inverted U-shaped housing having two generally parallel vertical strut members and a cross-member removeably connected between said strut members, said cross-member in contact with said jack plunger, said floor having opposed channels to slideably accommodate said strut members, a pivotal skid grasping yoke assembly connected to a lower portion of said strut members below said floor, and said yoke assembly including a pair of pivotal inwardly rotating members with apertures for accommodating protruding strong points of the skid.

* * * * *